(12) United States Patent
Pereira Madeira

(10) Patent No.: US 10,239,005 B2
(45) Date of Patent: Mar. 26, 2019

(54) FILTER HOUSING, HOLLOW FILTER ELEMENT AND FILTER

(71) Applicant: Mann+Hummel GMBH, Ludwigsburg (DE)

(72) Inventor: Pedro Miguel Pereira Madeira, Bietigheim-Bissingen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 512 days.

(21) Appl. No.: 14/973,022

(22) Filed: Dec. 17, 2015

(65) Prior Publication Data

US 2016/0101380 A1    Apr. 14, 2016

Related U.S. Application Data

(63) Continuation of application No. PCT/EP2014/060964, filed on May 27, 2014, and a
(Continued)

(30) Foreign Application Priority Data

Jun. 20, 2013 (DE) .......... 10 2013 010 218
May 13, 2014 (DE) .......... 10 2014 006 850

(51) Int. Cl.
  *B01D 35/00* (2006.01)
  *B01D 35/30* (2006.01)
  (Continued)

(52) U.S. Cl.
  CPC ....... *B01D 46/0005* (2013.01); *B01D 35/005* (2013.01); *B01D 35/306* (2013.01);
  (Continued)

(58) Field of Classification Search
  None
  See application file for complete search history.

(56) References Cited

U.S. PATENT DOCUMENTS 5,065,901 A * 11/1991 Brane .......... G01F 1/06
  137/624.11
5,147,053 A * 9/1992 Friedenthal .......... B65D 50/046
  215/201

(Continued)

FOREIGN PATENT DOCUMENTS

DE  102012006426 A1  10/2013
GB  1367701 A  9/1974

*Primary Examiner* — Amber R Orlando
*Assistant Examiner* — Brit E. Anbacht
(74) *Attorney, Agent, or Firm* — James Hasselbeck

(57) ABSTRACT

A filter housing of a filter for air, water, fuel, oil or urea-water solution of an internal combustion engine, including: an inlet for fluid to be purified; and an outlet for purified fluid; a hollow filter element including a filter medium for filtering fluid, which surrounds an element interior space with respect to a filter axis, is exchangeably arranged so as to separate the inlet from outlet; wherein the filter housing has at least two housing parts, which can be partly be separated from one another in order to open up an installation opening of the filter housing for the hollow filter element; wherein at least one of the housing parts has connecting tab(s) and at least one other of the housing parts has a tab receptacle(s) adapted to a connecting tab(s) for the insertion of the at least one connecting tab for connecting the housing parts.

6 Claims, 7 Drawing Sheets

Related U.S. Application Data continuation-in-part of application No. 14/017,767, filed on Sep. 4, 2013, now Pat. No. 9,726,123.

(51) Int. Cl.

| | |
|---|---|
| *B01D 46/00* | (2006.01) |
| *B01D 46/24* | (2006.01) |
| *F02M 35/02* | (2006.01) |
| *F02M 35/09* | (2006.01) |
| *F02M 35/024* | (2006.01) |

(52) U.S. Cl.
CPC ....... *B01D 46/009* (2013.01); *B01D 46/0041* (2013.01); *B01D 46/2414* (2013.01); *F02M 35/0203* (2013.01); *F02M 35/02425* (2013.01); *F02M 35/02433* (2013.01); *F02M 35/02483* (2013.01); *B01D 2265/026* (2013.01); *B01D 2275/201* (2013.01); *B01D 2275/208* (2013.01); *F02M 35/02416* (2013.01); *F02M 35/09* (2013.01)

(56) References Cited

U.S. PATENT DOCUMENTS

| | | | |
|---|---|---|---|
| 5,699,601 A | 12/1997 | Gilliam et al. | |
| 6,152,979 A | 11/2000 | Cappuyns | |
| 7,063,730 B2* | 6/2006 | Connor | B01D 46/0005 55/493 |
| 7,662,203 B2* | 2/2010 | Scott | B01D 46/0001 55/498 |
| 8,147,576 B2 | 4/2012 | Gillenberg | |
| 8,292,984 B2* | 10/2012 | Baseotto | B01D 46/0024 55/498 |
| 8,657,900 B2* | 2/2014 | Menssen | B01D 45/16 123/198 E |
| 8,814,973 B2 | 8/2014 | Baseotto et al. | |
| 9,132,371 B2* | 9/2015 | Heim | F02M 35/02491 |
| 2001/0018865 A1* | 9/2001 | Wegelin | A47L 5/28 95/268 |
| 2003/0121242 A1* | 7/2003 | Rieger | B01D 46/2414 55/493 |
| 2008/0010958 A1* | 1/2008 | Fester | A47L 9/122 55/472 |
| 2008/0041026 A1* | 2/2008 | Engel | B01D 46/2411 55/432 |
| 2008/0110142 A1* | 5/2008 | Nelson | B01D 46/4227 55/357 |
| 2008/0190082 A1* | 8/2008 | Scott | B01D 46/0005 55/520 |
| 2010/0313533 A1* | 12/2010 | Muenkel | B01D 46/0021 55/484 |
| 2013/0086877 A1 | 4/2013 | Kori et al. | |
| 2013/0152520 A1 | 6/2013 | Tobe | |
| 2014/0298612 A1* | 10/2014 | Williams | A47L 9/10 15/347 |
| 2014/0373495 A1* | 12/2014 | Madeira | B01D 46/2411 55/502 |
| 2015/0013289 A1* | 1/2015 | Hasenfratz | F02M 35/02416 55/497 |
| 2015/0075127 A1* | 3/2015 | Schmid | F02M 35/02416 55/502 |
| 2015/0090653 A1* | 4/2015 | Kotale | B01D 35/30 210/236 |
| 2015/0167602 A1* | 6/2015 | Waltenberg | B01D 46/0004 55/501 |
| 2015/0176544 A1* | 6/2015 | Kaufmann | F02M 35/02416 55/425 |
| 2015/0204282 A1* | 7/2015 | Merritt | B01D 46/0023 55/482 |
| 2016/0101380 A1* | 4/2016 | Pereira Madeira | B01D 46/0041 55/503 |
| 2016/0115917 A1* | 4/2016 | Sorger | B01D 46/0005 55/481 |
| 2016/0129384 A1* | 5/2016 | Schulz | B01D 29/213 55/482 |
| 2016/0131093 A1* | 5/2016 | Moon | F02M 35/02416 55/385.3 |
| 2016/0144310 A1* | 5/2016 | Movia | B01D 46/2414 55/478 |

* cited by examiner

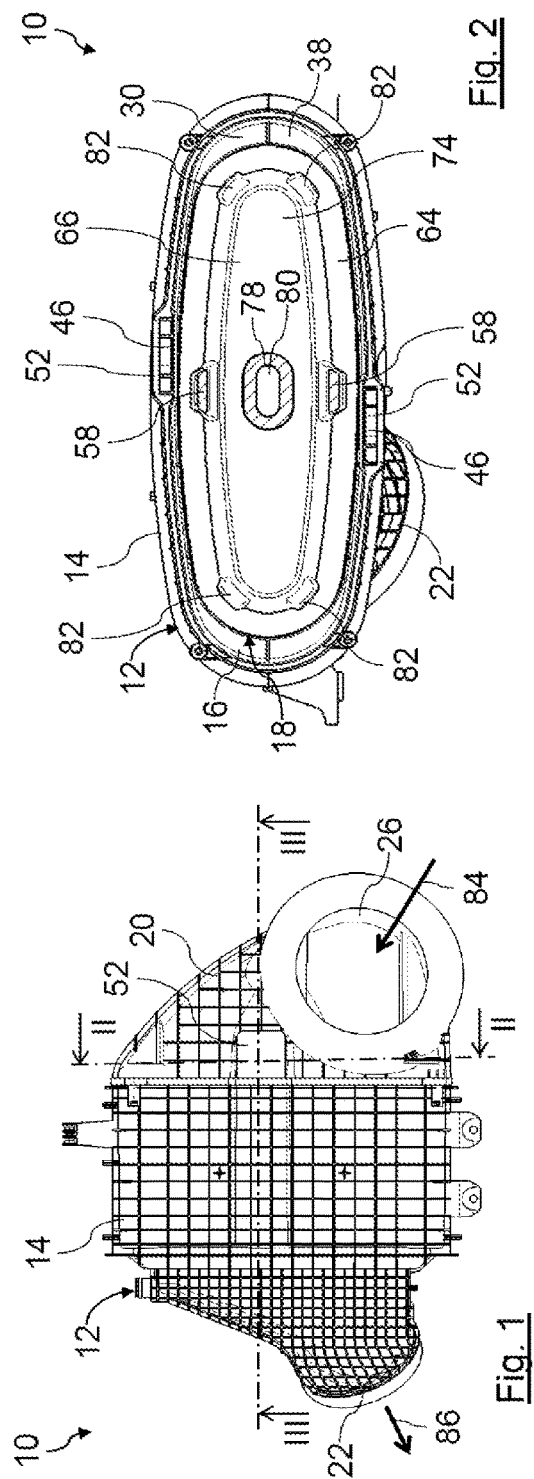
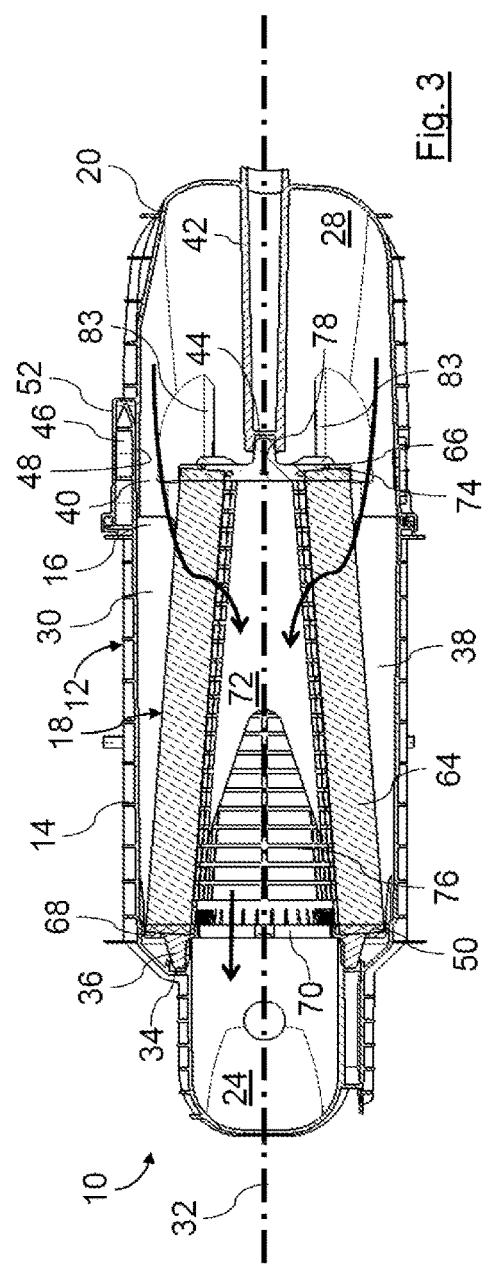

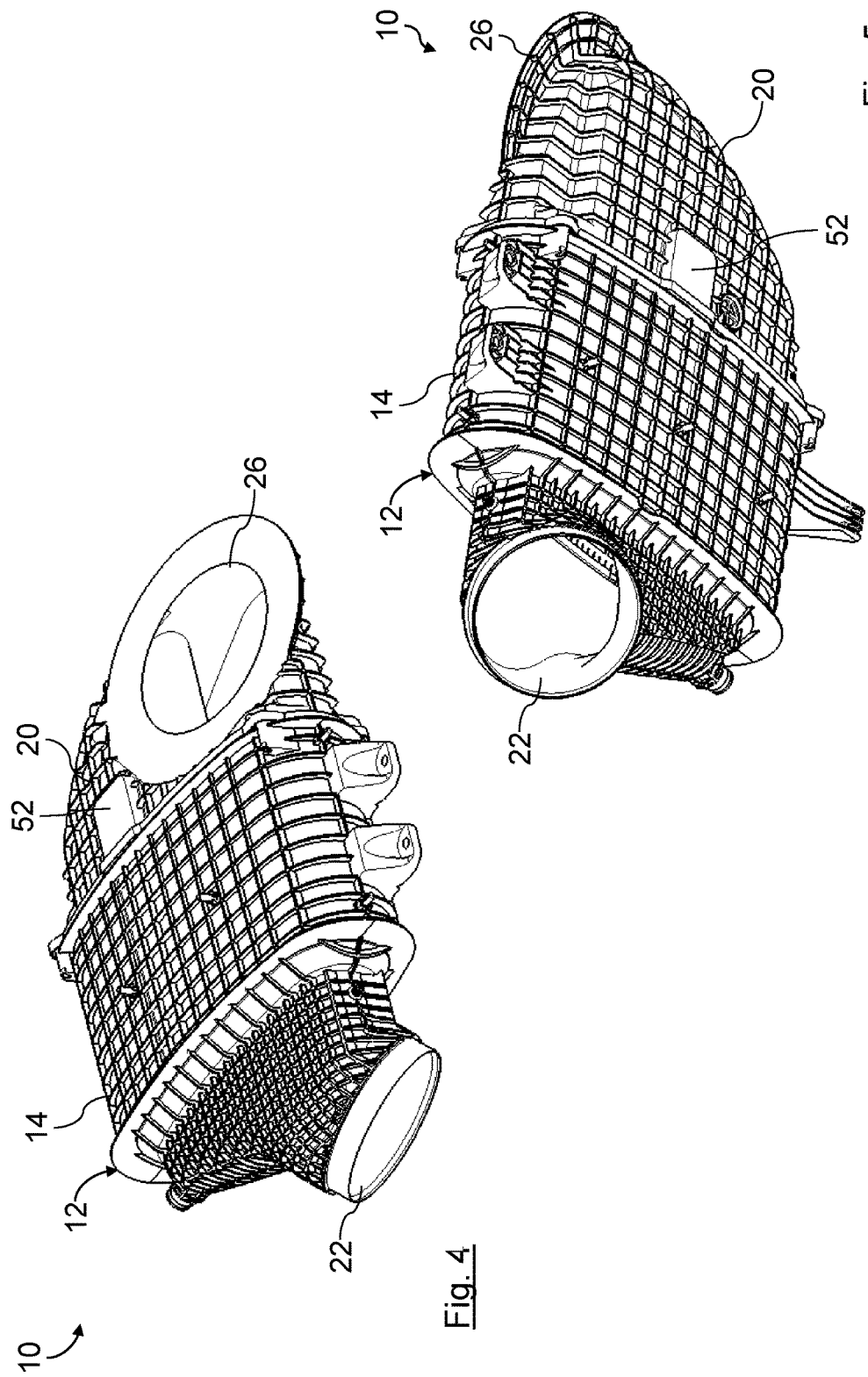

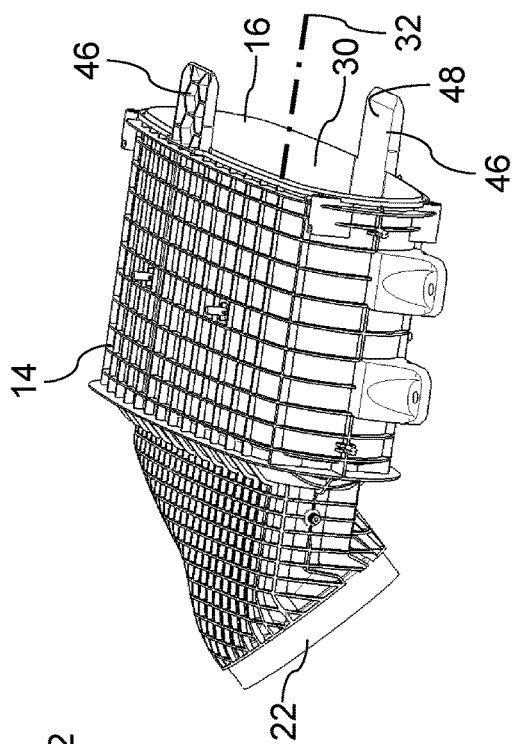
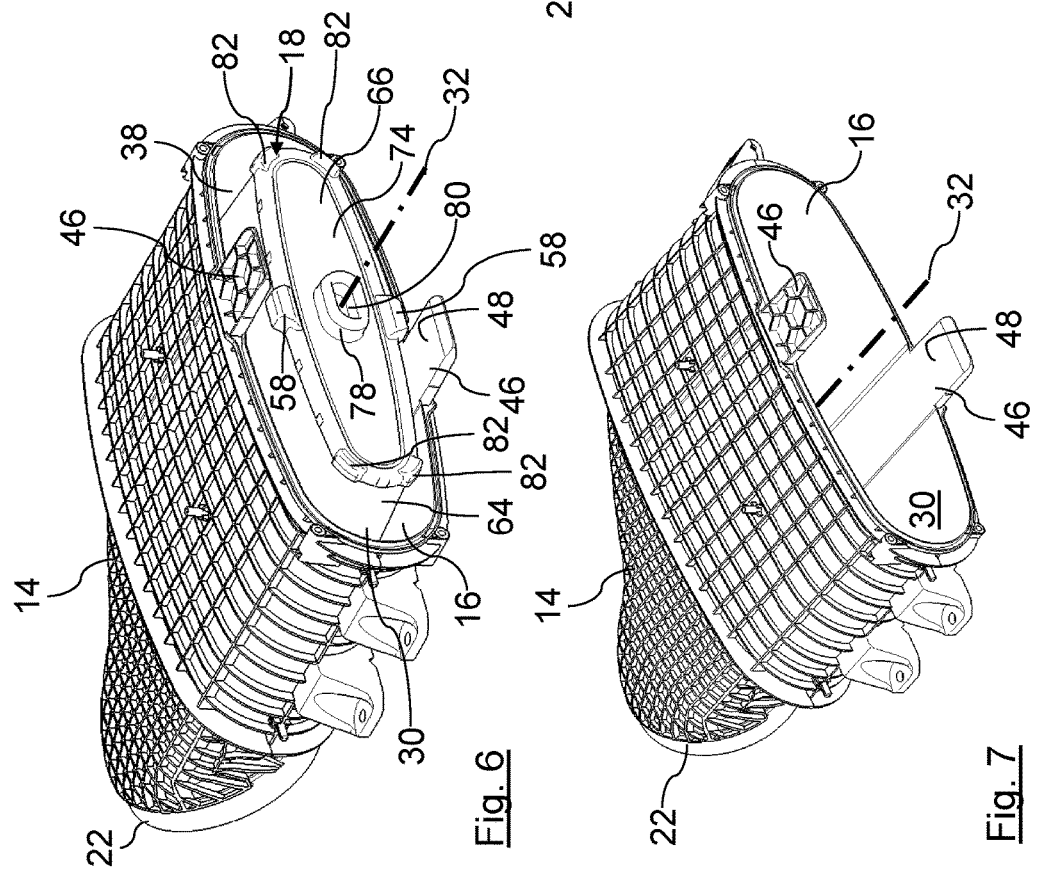

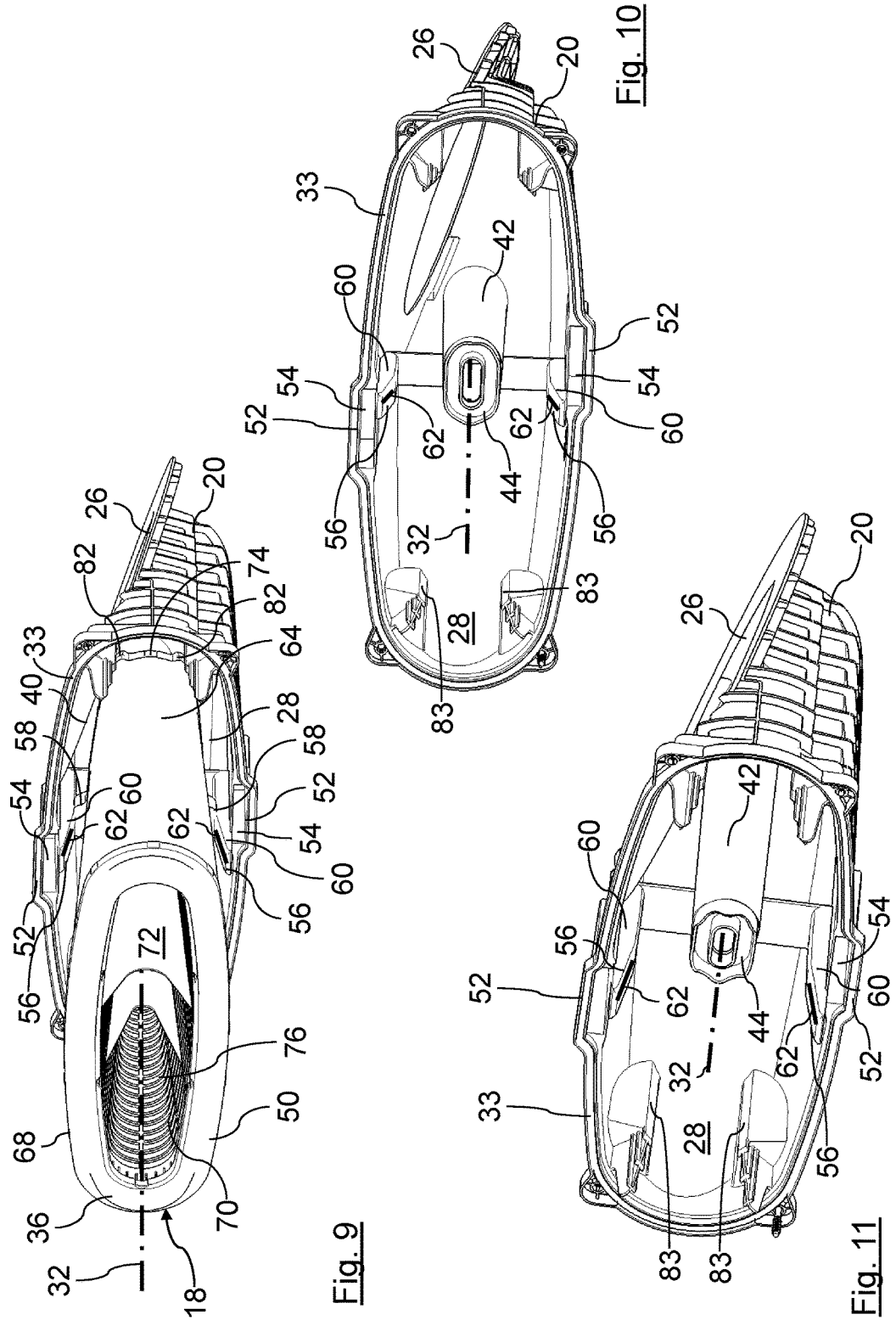

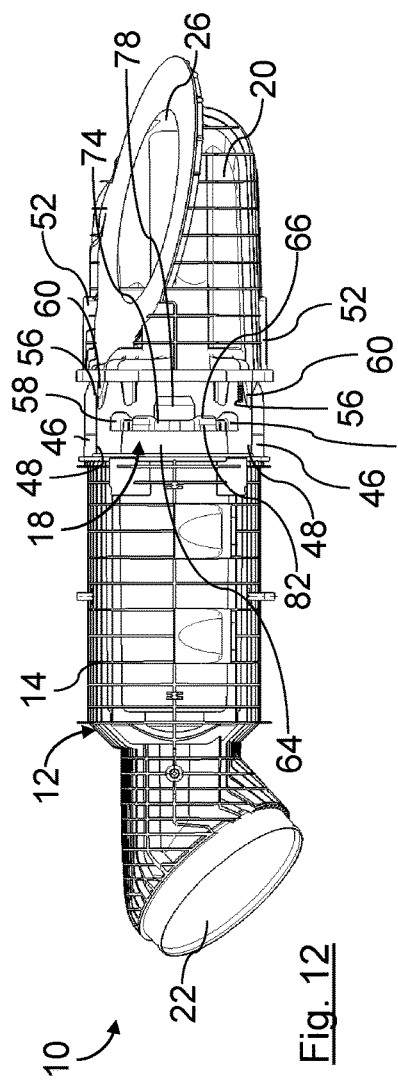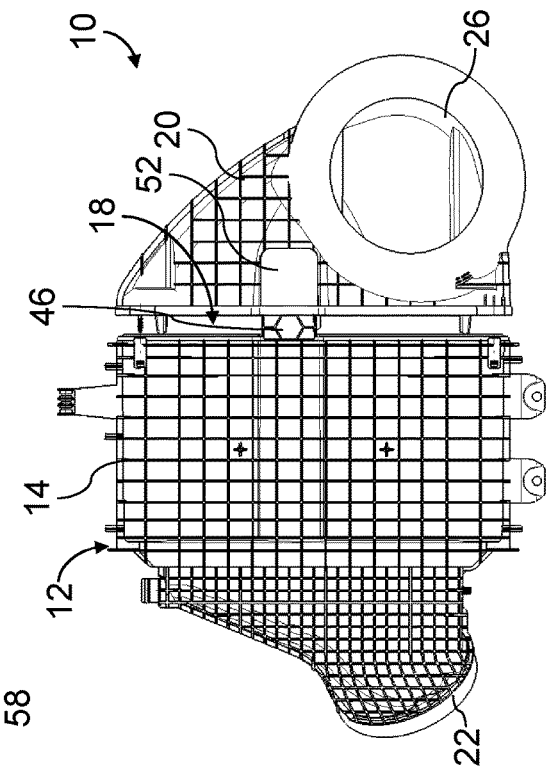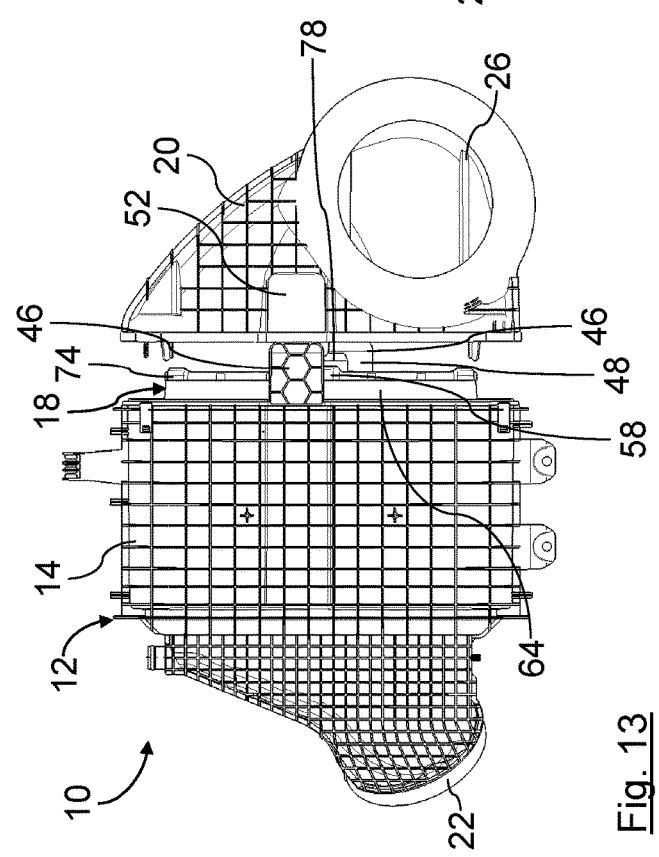

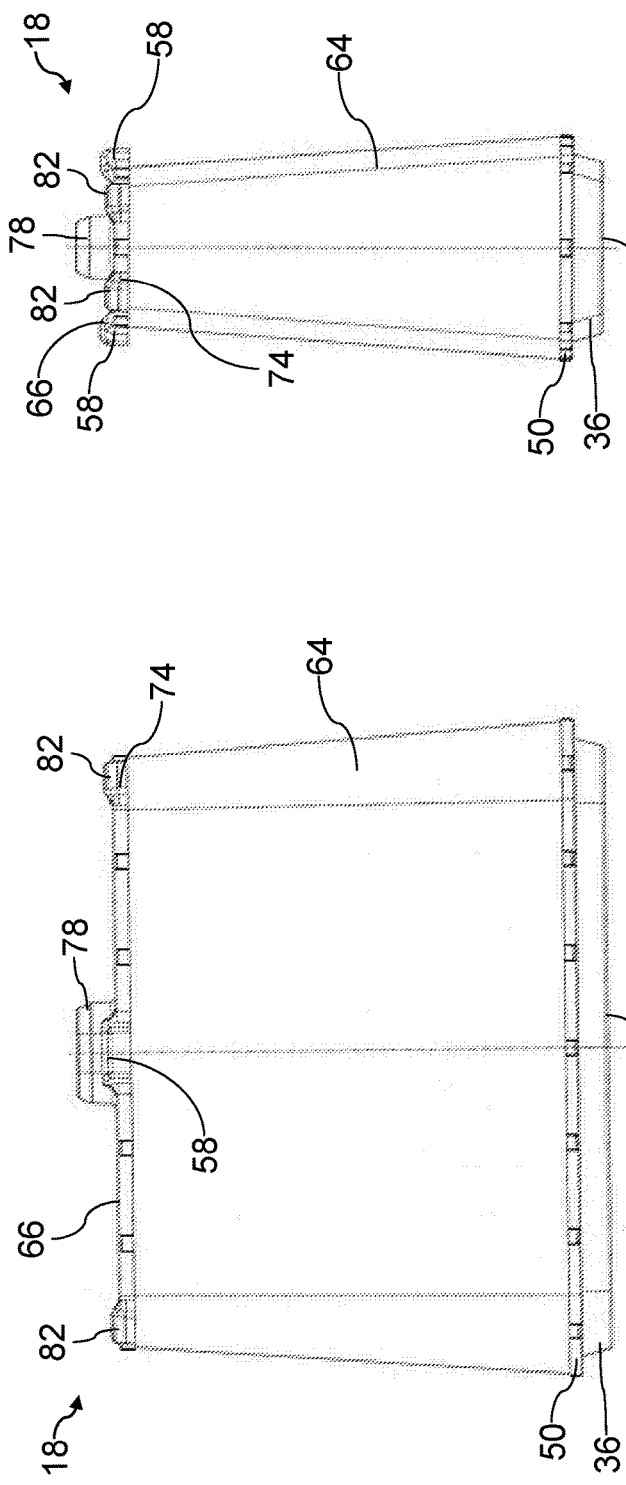
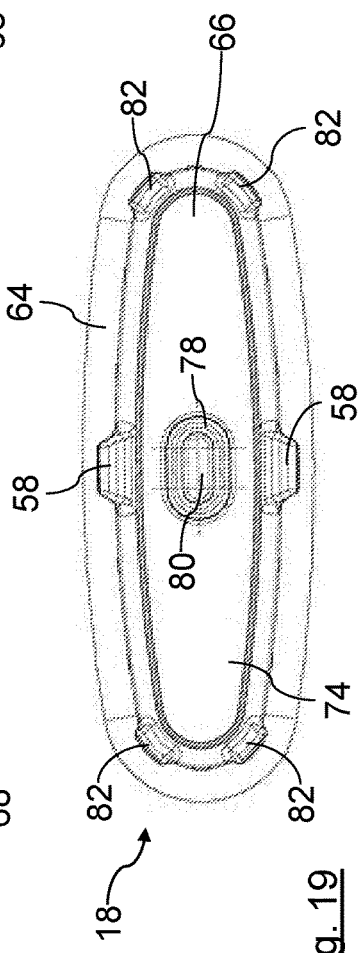
Fig. 17
Fig. 18
Fig. 19

FILTER HOUSING, HOLLOW FILTER ELEMENT AND FILTER

TECHNICAL FIELD

The invention relates to a filter housing of a filter for fluid, in particular air, water, fuel, oil or urea-water solution, in particular of an air filter, in particular of an internal combustion engine, in particular of a motor vehicle, in particular of a commercial vehicle, having at least one inlet for fluid to be purified and at least one outlet for purified fluid, and in which a hollow filter element including a filter medium for filtering a fluid, which surrounds an element interior space with respect to a filter axis, is exchangeably arranged so as to separate the at least one inlet from the at least one outlet, wherein the filter housing has at least two housing parts, which can at least partly be separated from one another in order to open up at least one installation opening of the filter housing for the hollow filter element.

The invention further relates to a hollow filter element, in particular a conical oval round filter element, of a filter for fluid, in particular air, water, fuel, oil or urea-water solution, in particular of an air filter, in particular of an internal combustion engine, in particular of a motor vehicle, in particular of a commercial vehicle, which can be arranged in a filter housing, in particular according to one of the preceding claims, such that it separates at least one inlet of the filter housing for fluid to be purified from at least one outlet for purified fluid, with a filter medium for filtering the fluid which circumferentially surrounds an element interior space with respect to an element axis.

Moreover, the invention relates to a filter for fluid, in particular air, water, fuel, oil or urea-water solution, in particular of an air filter, in particular of an internal combustion engine, in particular of a motor vehicle, in particular of a commercial vehicle, having a filter housing composed of at least two housing parts, which can at least partly be separated from one another in order to open up at least one installation opening of the filter housing, and in which a hollow filter element is exchangeably arranged.

BACKGROUND OF THE INVENTION

An air filter is known from the market which has a housing with a raw air inlet and a clean air outlet. A round filter element is arranged between the raw air inlet and the clean air outlet. The round filter element comprises a filter medium for purifying raw air. The housing has a housing container with an installation opening for the round filter element. The installation opening can be closed by a housing cover. In particular, the housing container can be separated from the housing cover for replacement of the round filter element.

SUMMARY OF THE INVENTION

The object of the invention is to design a filter housing, a hollow filter element and a filter of the aforementioned type in which assembly of the filter is simplified and/or an in particular mechanical stability of the filter can be improved. In particular, a connection of the housing parts can be simplified. Additionally or alternatively, a positioning and/or holding the filter element in the filter housing can be improved, in particular simplified.

This object is achieved in that at least one of the housing parts has at least one connecting tab and at least one other of the housing parts has at least one tab receptacle adapted to the at least one connecting tab for the insertion of the at least one connecting tab for connecting the housing parts.

For connecting the housing parts, in particular a housing cover with a housing container, the at least one connecting tab may be inserted into the at least one tab receptacle.

According to the invention, at least one connecting tab and at least one tab receptacle are provided which act as adjustment aids, connecting means and/or mechanical stabilization. Through the interaction of the at least one connecting tab with the at least one tab receptacle, the housing parts can be pre-adjusted during assembly. In this way, assembly can be made easier. The at least one connecting tab and the at least one tab receptacle may interact as a guiding aid during assembly of the housing parts. Further, tolerances, in particular component-related and/or assembly-related and/or operational-related tolerances, can be compensated by the at least one connecting tab and the at least one tab receptacle. This is in particular of advantage in the use of relatively large, in particular shallow conical oval, housing parts. During assembly of the filter housing, the at least one connecting tab can improve a mechanical stabilization of at least one corresponding circumferential wall portion of at least one of the housing parts. Here, the at least one connecting tab can support the at least one circumferential wall portion at least radially to the element axis and/or to a housing axis. Through the interaction of the at least one connecting tab with the at least one tab receptacle, a tightness at the transitions between the connected housing parts can be improved. A guiding of the hollow filter element into at least one of the housing parts during assembly of the housing parts can be more precise.

At least one of the housing parts, preferably all housing parts which are to be connected with one another by means of the at least one connecting tab, may be advantageously made from plastic. Advantageously, at least one of the housing parts may be realized by an injection molding process or blow molding process.

At least one of the housing parts may have an extension axial to the housing axis of 30 cm to 40 cm and more.

The at least one tab receptacle may advantageously be an indentation which is circumferentially closed with respect to its axis. In this way, the at least one connecting tab can be guided into and held in the at least one tab receptacle on all circumferential sides.

The at least one tab receptacle may advantageously have a corresponding insertion opening for the at least one connecting tab on the side facing the respective other housing part.

The at least one tab receptacle may advantageously be integrated into a circumferential wall of the corresponding housing part.

Advantageously, the at least one connecting tab and/or the at least one tab receptacle may extend parallel or axially to an assembly axis of the housing parts. In this way, the at least one connecting tab can be easily inserted into the at least one tab receptacle and guided there during assembly of the housing parts. The housing parts can be at least partially inserted into one another and/or connected at the edges.

Advantageously, the housing parts may be completely or partially separated from one another for opening the filter housing. At least the largest part of the hollow filter element, in particular the largest part of the filter medium, preferably the entire filter medium, can be housed in one of the housing parts, in particular the housing container. This housing part may advantageously be coaxial to the housing axis.

Advantageously, at least one of the housing parts of the filter housing may have an installation opening for the hollow filter element. The installation opening may be crossed by the filter axis in the installed state of the hollow filter element, and may in particular be coaxial to the filter axis. The installation opening can be at least as large as the largest outer dimension of the hollow filter element radial to the filter axis. The hollow filter element may be inserted into one housing part through the installation opening in the direction of the installation axis. Advantageously, the installation axis and/or the element axis and/or a housing axis and/or the assembly axis, in which the at least two housing parts are assembled or separated, may extend parallel or coaxially to one another. In this way, installation of the filter can be made easier.

The installation opening for the hollow filter element may advantageously be coaxial to the housing axis. The filter element may thus be installed simply into one housing part in the axial direction with respect to the housing axis.

The installation opening of the first housing part, and thus the filter housing, may be closed with other housing part, in particular the housing cover. A part of the hollow filter element, in particular a part of a respective end body, can also be accommodated here in the other housing part.

At least one housing seal may advantageously be provided between the housing parts. An interior space of the filter housing can be sealed at the junction between the two housing parts against the environment by means of the housing seal. The at least one housing seal may circumferentially surround the at least one installation opening. The housing seal may advantageously be arranged in a corresponding seal groove in one of the housing parts.

The at least one inlet and the at least one outlet may be located on the same or on different housing parts.

Advantageously, the hollow filter element may have radial extensions at its two end faces which are different with respect to the filter axis, in particular the element axis. Advantageously, the hollow filter element may be inserted into one of the housing parts with the larger end face forward. A size difference between the installation opening and the smaller end face of the hollow filter element can be compensated in the installation position of the hollow filter element by at least one leveling element.

The filter may advantageously be an air filter. The air filter may advantageously be part of the air intake tract of an internal combustion engine. It may be used for the purifying of combustion air which is supplied to the internal combustion engine.

However, the invention is not limited to an air filter of an air intake tract of an internal combustion engine of a motor vehicle, in particular a commercial vehicle. Rather, it may also be used in other types of air systems of motor vehicles. Advantageously, the air filter may also be a cabin filter. The filter, in particular air filter, can also be used outside of the automotive field, in particular in industrial motors. Advantageously, the filter may be a part of a commercial engine, in particular of a construction machine or a commercial motor vehicle, in particular a commercial vehicle, in particular a bus, construction machine or agricultural machine.

The invention may also be used for exhaust gas purification in internal combustion engines or other combustion systems.

In an advantageous embodiment, the at least one connecting tab may taper toward its free edge at least in a direction transverse to its axis of extension. The insertion of the connecting tab into the corresponding tab receptacle can thus be simplified.

In an advantageous embodiment, the filter housing can have at least one guide track for guiding and/or supporting at least one leveling element of the hollow filter element. A possible height difference at the end faces of the hollow filter element may be compensated by means of the at least one leveling element.

The at least one guide track, in particular at least one main guide line of the at least one guide track, may define a path of a contact point or contact region of the leveling element as it slides along the guide track during insertion of the hollow filter element into one of the housing parts or while placing one of the housing parts onto the hollow filter element.

Advantageously, the at least one connecting tab may be arranged in the assembled filter housing on the same circumferential side of the filter housing as the at least one leveling element. In this way, the at least one leveling element may push from the inside against the at least one circumferential wall portion of at least one of the housing parts, and the at least one connecting tab and/or the corresponding tab receptacle may provide resistance from the outside.

Advantageously, the at least one connecting tab may be arranged in the assembled housing on the same circumferential side of the filter housing as optionally the at least one guide track for the at least one leveling element. The connecting tab/tab receptacle and the corresponding leveling element/guide track may advantageously be arranged circumferentially offset from one another.

Advantageously, the at least one guide track may be arranged radially with respect to the element axis/housing axis between the at least one leveling element and the at least one connecting tab/tab receptacle. In this way, the at least one guide track can be supported against a pressure from the at least one leveling element by means of the at least one connecting tab/tab receptacle.

Advantageously, at least one housing part, in particular a housing cover, may comprise the at least one guide track. The at least one guide track may advantageously extend exclusively in one of the housing parts.

The at least one guide track may extend with an at least imaginary main guide line at least in a plane with the installation axis of the hollow filter element in the housing part, in particular the housing cover, and/or the assembly axis between the housing parts.

Advantageously, a base area of the installation opening may be oblong, in particular oval. The main guide line of the at least one guide track may be located in a minor plane with a minor axis of the base area of the installation opening and the installation axis. Further features and advantages of the at least one leveling element are described in more detail below in connection with the hollow filter element according to the invention.

In a further advantageous embodiment, a base area of the installation opening may be oblong, in particular oval, and the at least one connecting tab and the at least one tab receptacle may be located at least partially on or next to a minor plane with a minor axis of the base area of the installation opening and an installation axis of the hollow filter element in the filter housing; the opposing connecting tabs/tab receptacles may optionally be respectively located at least partially on/next to the minor plane.

Advantageously, the at least one connecting tab and the at least one tab receptacle may be located on a long side of the filter housing, which is oblong in cross-section. When viewed circumferentially with respect to the housing axis, the at least one connecting tab and the at least one tab receptacle may advantageously be centrally located, in particular in or near the center, on the long side.

Advantageously, the main guide line of the at least one guide track may optionally be located in a minor plane with a minor axis of the base area of the installation opening and the installation axis. Advantageously, the main guide line of any opposing guide tracks may each be located in the minor plane. In this way, the support and guiding by means of the at least one leveling element on the at least one guide track may occur on a long side of the filter housing. The guiding and/or positioning can thus be further improved.

In an advantageous embodiment, the at least one guide track may extend in a region outside an interior space of the corresponding housing part, in particular the housing cover.

In this way, a guiding of the at least one leveling element can take place at an early stage in the assembly of the housing parts.

Advantageously, at least one guide arm may be provided, on which the at least one guide track can be realized.

The at least one guide arm can advantageously extend beyond the interior space of the corresponding housing part, in particular the housing cover. In this way, the corresponding at least one leveling element can be guided on the at least one guide arm, before the filter element enters into the housing part.

The interior space of the housing part with the at least one guide track may at least contribute to the formation of an inlet space portion for inletting the fluid.

Advantageously, the at least one guide arm may be chamfered outside the housing part on a circumferential side facing the housing axis. The chamfered circumferential side contributes to the formation of the at least one guide track. The at least one guide track may thus extend toward the housing axis when regarded in the direction of the housing axis toward the interior space of the housing part. In this way, the insertion or placement of the at least one leveling element can be simplified.

In a further advantageous embodiment, at least two guide tracks may be located with respect to the filter axis on diagonally opposite radially inner circumferential sides of one of the housing parts, in particular the housing cover.

In this way, the hollow filter element may be guided evenly into the filter housing, centered and/or held by means of the correspondingly opposite leveling elements.

The main guide lines of the opposing guide tracks may be respectively located in a minor plane with the minor axis of the base area of the installation opening and the installation axis.

In a further advantageous embodiment, at least one support portion for supporting at least one support element of the hollow filter element with respect to the housing axis, which may coincide with the element axis in an installed hollow filter element, may be centrally arranged in/on the filter housing.

Advantageously, the at least one support portion can interact with at least one support element of the hollow filter element in the assembled filter. The positioning of the hollow filter element and/or the assembly of the at least one support element can thus be simplified by means of the at least one support portion.

Advantageously, the at least one support portion may be located on or in one of the housing parts. In this way, the at least one support portion and the at least one support element can be brought together during installation of the hollow filter element in one of the housing parts and/or during assembly of the housing parts. An assembly of the filter can thus be simplified.

Advantageously, the at least one support portion may be arranged on a raw fluid side of the hollow filter element. Alternatively or additionally, at least one support portion may be arranged on a clean fluid side.

Advantageously, the hollow filter element can be supported on the other housing part with its end face which lies opposite the at least one support element.

Advantageously, the at least one support element and the at least one support portion may not have a sealing function. In this way, the support function and the sealing function can be separated from one another and respectively optimized. The sealing function may be associated with at least one other component pair and optimized, which component pair is separate from the at least one support element and the at least one support portion.

Advantageously, the at least one support portion may have at least one cylindrical and/or at least one conical portion. A major axis of the at least one support portion, in particular of the cylindrical/conical portion, may advantageously extend axially or parallel to the housing axis. In this way, the at least one support portion and the at least one support element may have the same orientation with an installed hollow filter element.

With an assembled hollow filter element, the major axes of the at least one support element and the at least one support portion may advantageously extend coaxially. In this way, the at least support element can be easily inserted onto and/or into the at least one support portion. With an assembled hollow filter element, the major axes of the at least support element and the at least one support portion may advantageously extend parallel or axially to the installation axis of the hollow filter element relative to the filter housing and/or to the assembly axis of the housing parts, in particular to the housing part with the at least one support portion. The at least one support element and the at least one support portion may thus be brought easily and automatically into contact during installation of the hollow filter element in the filter housing and/or during assembly of the housing parts.

Advantageously, the at least one support element may be at least partially complementary to the at least one support portion. The at least one support element can thus lie flat against the at least one support portion. In this way, a reliable and stable support may result which is transverse, in particular radial and/or tangential, to the element axis and/or to the housing axis.

The at least one support portion may advantageously have an oval, flat-oval or round base area. The at least one support portion may also have another type of base area, in particular a square base area.

Advantageously, the at least one support portion may have a receptacle on its end face, in particular a groove, at least for a portion of the at least one support element. Advantageously, the groove may extend circumferentially with respect to the major axis of the at least one support portion. The groove may advantageously be located on an end face of the at least one support portion facing the hollow filter element. Alternatively or additionally, the at least one support portion may advantageously have a hollow cylindrical or sleeve-like portion.

Advantageously, the at least one support portion may be a sort of pillar or dome, or may comprise these or be a part thereof. The at least one support element of the hollow filter element may be supported on the free end of the pillar or dome. With the other end, the pillar or dome may be connected with the filter housing, in particular with the housing part which has the at least one guide track for the at least one leveling element. It may in particular be integrally connected to the filter housing.

The pillar or dome may advantageously extend through a portion of space of the filter housing. In this way, the hollow filter element may be supported at a distance from a corresponding housing wall of the filter housing spanned by the pillar or dome. Advantageously, the portion of space may be flowed through by fluid during operation of the filter. Depending on the direction of flow of the fluid in the filter housing, the portion of space may be an inlet portion of space or an outlet portion of space.

The object is further achieved by the hollow filter element in that, radially outward with respect to the element axis, the hollow filter element has at least one leveling element in a region which, in the installed state of the hollow filter element, overlaps or is adjacent to a portion of the filter housing, in/on which at least one connecting tab and/or at least one tab receptacle is arranged for connecting the housing parts.

The features and advantages shown above in connection with the filter housing according to the invention and its advantageous embodiments apply accordingly to the hollow filter element according to the invention and advantageous embodiments thereof, and vice versa.

Advantageously, the extension of the filter element may be smaller on a first of its end faces in a direction radial to the element axis than on a second of its end faces. Advantageously, the filter medium may have a first end body at least on the smaller end face.

The at least one leveling element may be arranged radially outward on a first end body of the hollow filter element with respect to the element axis, in particular the filter axis.

Advantageously, the first end body may have at least one leveling element in a radially outward portion with respect to the element axis in the at least one direction of the smaller extension with respect to the element axis.

Advantageously, different distances from the edges of the hollow filter element radial to the element axis can be equalized to the differently-sized end faces of the hollow filter element with the at least one leveling element. A height equalization can be achieved with the at least one leveling element. The hollow filter element can thus be aligned in the filter housing. Advantageously, the element axis may be aligned parallel or coaxially to the filter axis and/or to the housing axis. In particular with a horizontal arrangement of the hollow filter element, in which the element axis extends horizontally, different heights at the differently-sized end faces can be equalized in this way.

Advantageously, the at least one leveling element may be at least partially elastic. In this way, the hollow filter element can be more easily fixed in the filter housing. The at least one leveling element may give way and be compressed during installation of the filter. Any tolerances, in particular production-related and/or component-related and/or assembly-related tolerances, of the hollow filter element can be easily equalized in the filter housing with the at least one leveling element. Further, the at least one leveling element may additionally serve as a vibration damper, in particular during operation of the air filter.

Alternatively or additionally, the at least one leveling element may advantageously be at least partially rigid. Advantages may thus result during assembly of the filter. With a rigid leveling element, a more accurate and simpler guiding on the corresponding housing-side guide portion may occur.

The leveling element may advantageously serve as a spacer. Advantageously, a radial distance with respect to the element axis between the radially outer circumferential side of the first end body and a correspondingly opposite portion of the filter housing can be realized by means of the at least one leveling element. A gap may thus be realized between the filter element in the region of the smaller end face and an inner wall of the filter housing which radially outwardly surrounds the filter element. By means of the gap, fluid may flow into or out of a space which radially outwardly surrounds the filter element. Fluid may thus flow, in particular axially to the element axis, from an inlet portion of space of the filter housing to the inflow side of the filter medium. In the direction of flow through the filter medium from radially outside to radially inside, the upstream side of the filter medium is located on the radially outer circumferential side of the filter element. The downstream side of the filter element is thus located in the element interior space. The fluid stream may flow axially to the element axis from the upstream side of the filter medium into a corresponding outlet portion of space of the filter housing. By means of the axial flow of fluid, an improved packing size of the filter housing, and thus a smaller footprint, can be realized. Further, in an axial flow of fluid to the upstream side and/or away from the downstream side, a pressure difference between the upstream side and downstream side can be reduced. Thus, in particular a lower pressure difference can be realized than in a comparable filter in which the flow of fluid is led tangentially to the upstream side of the filter element or away from the downstream side.

The first end body may advantageously be an end plate or at least comprise an end plate.

The filter medium can be stabilized with the first end body. Further, the filter medium can be sealed at the smaller end face with the first end body.

Advantageously, the element interior space may be closed with the first end body at the smaller end face of the filter element. In this way, a flow of fluid out of the element interior space or into the element interior space can be prevented there. It may thus be achieved that the fluid must flow through the filter medium. The fluid may flow through the filter medium from radially outside to radially inside into the element interior space, or in the opposite direction out of the element interior space. The fluid may flow through a corresponding throughflow opening on the other end face of the filter element into the element interior space or out of the element interior space.

The hollow filter element may advantageously be a round filter element with a round cross-section, an oval round filter with an oval cross-section, a flat-oval round filter element with a flattened oval cross-section, a conical round filter element, in which the round cross-section tapers in the axial direction of the element axis, a conical oval round filter element, in which the oval cross-section tapers in the axial direction of the element axis at least in the direction of a transverse axis, a conical flat-oval round filter element, in which the flat-oval cross section tapers in the axial direction of the element axis at least in the direction of a transverse axis, or a hollow filter element with another type of, especially square, cross-section and/or another type of cross-sectional variation in the direction of the element axis.

The at least one leveling element may advantageously be arranged on a long, in particular flat, side of an oval, in particular a flat-oval, round filter element.

The at least one leveling element may advantageously be arranged on the tapered end face of a conical, in particular conical oval or shallow conical oval, round filter element.

Advantageously, the first end body may have a respective leveling element on the diagonally opposite circumferential sides in the at least one direction of the smaller extension with respect to the element axis. In this way, the first end body may be supported on opposite sides against the filter housing. A more even and/or more precise guiding/positioning/holding in the filter housing can thus occur.

Advantageously, a base area of the hollow filter element may be oblong, in particular oval, at least in the area of the smaller end face, and an imaginary midpoint of the at least one leveling element may be located on a minor axis of an imaginary plane which extends parallel to the base area of the hollow filter element. Optionally, the midpoints of opposite leveling elements can be respectively located on the minor axis. In this way, the first end plate may be supported approximately centrally on its respective long sides. Support and/or guiding can thus be improved.

The minor axis is the short axis of the elongated surface through the center thereof. In contrast, the major axis is the long axis of the elongated surface through the center thereof.

Advantageously, the at least one leveling element may extend radially, in particular radially and axially, outward over the radially outer circumferential side of the filter medium. The at least one leveling element may thus enable a radial support. A distance between a radially outer circumferential side of the filter medium and a corresponding circumferential side of the filter housing can be achieved by means of the at least one leveling element.

If the at least one leveling element additionally extends beyond the filter medium in the axial direction, an additional axial support may thus result. In this way, a tilting or canting of the at least one end body relative to the element axis can be countered.

Advantageously, a distance of a radially outer circumferential side of the at least one leveling element from the element axis may advantageously correspond to a distance of the corresponding radially outer circumferential side of the hollow filter element from the element axis at the larger end face.

In this way, the hollow filter element can be oriented with its element axis uniformly parallel or coaxial to the housing axis.

Alternatively or additionally, a distance of the radially outer circumferential side of the at least one leveling element from the element axis may advantageously be larger than the corresponding distance of the radially outer circumferential side of the hollow filter element, in particular an end body there, at the larger end face. In this way, different diameters of the filter housing can be equalized at the respective end faces of the hollow filter element.

In the final installation position of the hollow filter element in a filter housing of the filter in its usual position, the at least one leveling element can advantageously be arranged spatially below. The at least one leveling element can thus support the hollow filter element with respect to gravity against the filter housing.

In the final installation position in the typical operating position, the at least one direction of the smaller extension can advantageously extend spatially vertically. In the installation location in the typical operating position, the element axis can advantageously extend horizontally.

In an advantageous embodiment, the hollow filter element may have at least one support element on an end face on an outer side facing away from the element interior space.

The at least one support element and thus the hollow filter element may be supported at least transverse to the element axis, in particular radially or tangentially to the element axis or radial to another axis which is parallel to the element axis. In this way, the hollow filter element can additionally be positioned and held in the radial direction with respect to the element axis.

Advantageously, the at least one support element may additionally be supported in the axial direction with respect to the element axis in the filter housing. In this way, the axial position of the hollow filter element can be improved. The hollow filter element can advantageously be clamped and held in the axial direction between two opposing support portions of the filter housing.

Advantageously, the at least one support element may be arranged centrally with respect to the element axis on the smaller end face of the hollow filter element. The hollow filter element can thus be supported centrally. In this way, an improved support of the hollow filter element on the filter housing may occur with only one support element and only one corresponding support portion. Support can thus be realized with a small footprint of the required components in the filter housing.

Advantageously, the at least one support element may be at least partially elastic. In this way, any installation tolerances of the hollow filter element in the filter housing can easily be equalized with the at least one support element. Further, the at least one support element may additionally serve as a vibration damper, in particular during operation of the filter.

The at least one support element may have at least one cylindrical and/or at least one conical portion. A major axis of the at least one support element may extend axially or parallel to the element axis. The support element can be supported transversely or axially to the element axis against at least one corresponding support portion on the side of the filter housing.

The at least one support element may advantageously have an oval, flat-oval or round base area. It may also have another type of base area, in particular a square base area.

Advantageously, the at least one support element may have a hollow cylindrical or sleeve-like portion.

The at least one support element may have a cavity which is open to the at least one support portion of the filter housing. A corresponding projection of the at least one support portion may dip into the cavity. In this way, support can be further improved.

When the hollow filter element is correctly assembled, the hollow cylindrical or sleeve-like portion of the at least one support element may advantageously be inserted into a corresponding end face-side receptacle, in particular a groove, of the at least one support portion. The groove may be regarded as the cavity of the support portion, which is open towards the free end face of the support portion.

Advantageously, the at least one support element can be arranged on the first end body of the hollow filter element.

The technical object is achieved by the filter according to the invention, in that at least one of the housing parts has at least one connecting tab and at least one other of the housing parts has at least one tab receptacle adapted to the at least one connecting tab for the insertion of the at least one connecting tab for connecting the housing parts.

The features and advantages shown above in connection with the filter housing according to the invention and the hollow filter element according to the invention and its advantageous embodiments apply accordingly to the filter according to the invention and advantageous embodiments thereof.

The filter housing can advantageously be a filter housing according to the invention.

Advantageously, an inlet-side inlet portion of space, and element portion of space, in which the hollow filter element can be arranged, and an outlet-side outlet portion of space of the filter housing can be arranged one after the other, linearly and along the direction of flow of the fluid through the filter. In this way, an axial flow of the fluid to the upstream side of the filter medium can easily be realized. Further, an axial discharge of the filtered fluid from the clean fluid side of the hollow filter element can thus be achieved. Any differences in pressure between the clean fluid side and the raw fluid side can thus be reduced. Advantageously, a main flow direction of the fluid from the inlet portion of space through the element portion of space into the outlet portion of space may be substantially axial to the element axis and/or to the housing axis.

BRIEF DESCRIPTION OF THE DRAWINGS

Further advantages, features and details of the invention will become apparent from the following description in which an embodiment of the invention with reference to the drawings is explained in more detail. A person skilled in the art will also appropriately consider the features disclosed in the drawings, the description and the claims individually and combine them into further sensible combinations.

FIG. 1 shows a plan view of an air filter of an internal combustion engine with a filter housing including a housing container and a housing cover, in which an exchangeable conical oval round filter element is arranged;

FIG. 2 shows a transverse-side cross-section of the air filter of FIG. 1 along the section line II-II;

FIG. 3 shows a longitudinal-side cross-section of the air filter of FIG. 1 along the section line III-Ill;

FIG. 4 shows a first isometric oblique view of the air filter of FIGS. 1 to 3;

FIG. 5 shows a second isometric oblique view of the air filter of FIGS. 1 to 4;

FIG. 6 shows an isometric representation of the open housing container of the air filter of FIGS. 1 to 5 with the round filter element;

FIG. 7 shows an isometric representation of the open housing container of the air filter of FIGS. 1 to 6, here without the round filter element;

FIG. 8 shows an isometric representation of the open housing container of the air filter of FIGS. 1 to 7, without the round filter element from a different perspective;

FIG. 9 shows an isometric representation of the housing cover of the air filter of FIGS. 1 to 5 with the round filter element, without the housing container;

FIG. 10 shows an isometric representation of the housing cover of the air filter of FIGS. 1 to 5, without the round filter element;

FIG. 11 shows the isometric representation of the housing cover of FIG. 10 from another perspective;

FIG. 12 shows a side view of the air filter of FIGS. 1 to 5 in an early stage of assembly of the housing cover on the housing container;

FIG. 13 shows a plan view of the air filter in the stage of assembly of FIG. 12;

FIG. 14 shows a plan view of the air filter in a stage of assembly following the stage of assembly shown in FIG. 13;

FIG. 17 shows a longitudinal-side side view of the round filter element of the air filter of FIGS. 1 to 5;

FIG. 18 shows a transverse-side side view of the round filter element of the air filter of FIGS. 1 to 5;

FIG. 19 shows a plan view of an inlet-side end plate of the round filter element of the air filter of FIGS. 1 to 5;

In the figures, identical components are provided with the same reference characters.

DETAILED DESCRIPTION OF THE INVENTION

Figures 15, 16:
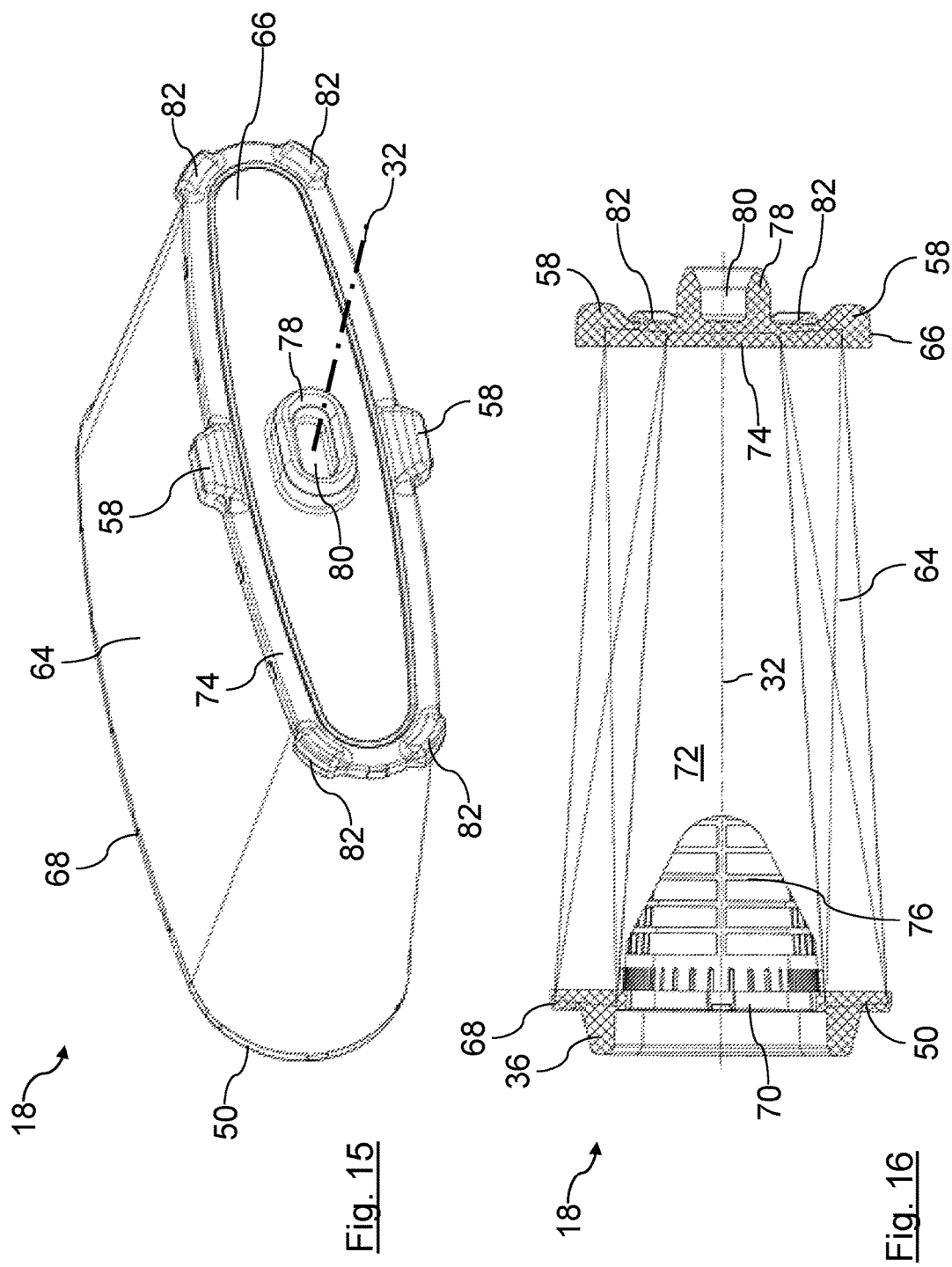
FIG. 15 shows an isometric representation of the round filter element of the air filter of FIGS. 1 to 5.
FIG. 16 shows a transverse-side longitudinal section of the round filter element of the air filter of FIGS. 1 to 5.

FIGS. 1 to 14 show an air filter 10 of an internal combustion engine of a commercial vehicle in various views and stages of assembly. The air filter 10 is arranged in an air intake tract of the internal combustion engine. It is used for the purifying of combustion air which is supplied to the internal combustion engine for combustion.

The air filter 10 includes an openable filter housing 12. The filter housing 12 is flat-oval. With respect to an oval filter housing with an approximately elliptical cross-section, the filter housing 12 is flattened in the direction of its short transverse axis. FIG. 3 shows a section along a short transverse axis of the filter housing 12. The filter housing 12 has a housing container 14, to the left in FIGS. 1 and 3. The housing container 14 has an installation opening 16, which is shown for example in the foreground in FIGS. 6 to 8, for installation of a filter element 18. The installation opening 16 is closed with the housing cover 20, to the right in FIG. 1.

The housing container 14 has an outlet 22 for the filtered air, which opens into an outlet portion of space 24 of the housing container 14. The outlet 22 is connected outside the filter housing 12 with the internal combustion engine via air lines, not shown.

The housing cover 20 has an inlet 26 for air to be filtered, which opens into an inlet portion of space 28 of the housing cover 20 and which is connected with the environment outside the filter housing 12.

The filter element 18 is arranged in an element portion of space 30 of the housing container 14 such that it separates the inlet 26 from the outlet 22. The element portion of space 30 is located in a linear arrangement between the inlet portion of space 28 and the outlet portion of space 24.

The inlet portion of space 28, the element portion of space 30 and the outlet portion of space 24 are arranged one after the other axially to a filter axis 32. For the sake of clarity, the filter axis 32 in FIG. 3 is shown in front of the drawing plane, although it is located outside the sectional plane III-III of FIG. 1.

In the embodiment shown, the filter axis 32 coincides with a housing axis of the filter housing 12 and, with an installed filter element 18, with an element axis of the filter element 18. The filter axis 32 also presently coincides with an installation axis, along which the filter element 18 is inserted into and can be removed from the housing container 14. In addition, the filter axis 32 coincides with an assembly axis, along which the housing cover 20 is assembled on the housing container 14. For the sake of clarity and comprehensibility, in the embodiment illustrated in the description the enumerated axes are briefly designated as the "filter axis 32." When further reference is made to "axial," "radial," "circumferential" or "coaxial", this refers unless otherwise stated to the filter axis 32.

The installation opening 16 circumferentially surrounds the filter axis 32. In the installed state of the filter element 18, the filter axis 32 crosses the installation opening 16. The inner dimension of the installation opening 16 is larger than the largest outer dimension of the filter element 18 radial to the filter axis 32. A base area of the installation opening 16 is an elongated flat-oval.

A seal groove 33, shown in particular in the FIGS. 3 and 9 to 11, is arranged with a housing seal in the end face of the free edge of the housing cover 20. The housing seal is sealingly applied against the corresponding end face of the free edge of the housing container 14 and surrounds the installation opening 16 in a circumferentially closed manner.

The housing container 14 has a circumferentially closed sealing surface 34 axially between the element portion of space 30 and the outlet portion of space 24. The sealing surface 34 extends in the radial direction. The sealing surface 34 faces the housing cover 20. A seal 36 of the filter element 18 is sealingly applied to the sealing surface 34 in a circumferentially closed manner.

The radially inner cross-section of the element portion of space 30 is larger than a radially outer cross-section of the sealing surface 34.

An upstream annular space 38 is realized between a radially outer circumferential side of the filter element 18 and the radially inner circumferential side of the element portion of space 30. The upstream annular space 38 is separated by means of the seal 36 from the outlet portion of space 24.

The upstream annular space 38 is connected with the inlet portion of space 28 on the side facing the housing cover 20 by means of a circumferential gap 40. The inlet portion of space 28 and the inlet portion of space 38 are located on the raw air side of the filter element 18.

A support pillar 42 is arranged on the housing cover 20. The support pillar 42 is integrally connected with the housing cover 20. It is approximately coaxial with the filter axis 32. It is arranged centrally with respect to the filter axis 32. The support pillar 42 extends into the inlet portion of space 28 from an inner side of the housing cover 20 facing the filter element 18 up to an outlet-side end face 66 of the filter element 18. The support pillar 42 is located on the raw air side of the filter medium 64.

A circumferential counter support groove 44, shown for example in FIGS. 10 and 11, is arranged so as to extend coaxially to a major axis of the support pillar 42, thus to the filter axis 32, on the free end face of the support pillar 42 facing the filter element 18. The counter support groove 44 is an annular cavity in the support pillar 42 which is open towards the free end face of the support pillar 42.

The housing container 14 further has two connecting tabs 46 for connection to the housing cover 20. The connecting tabs 46 are located with respect to the filter axis 32 on opposite flattened circumferential sides of the housing container 14. They are each integrally mounted with one end on the free circumferential edge of the housing container 14 which surrounds the installation opening 16. The connecting tabs 46 extend parallel to the assembly axis of the housing cover 20 with the housing container 14, i.e. parallel to the filter axis 32. Imaginary central axes of the connecting tabs 46 lie in an imaginary plane with the filter axis 32. Regarded in the direction of the filter axis 32, this imaginary plane is inclined with respect to another imaginary plane with a minor axis of the oval installation opening 16. The imaginary central axes of the connecting tabs 46 are thus, as can be seen for example in FIG. 2, respectively laterally offset on opposite sides with respect to the minor axis.

The mutually facing inner sides of the connecting tabs 46 are smooth. The inner sides of the connecting tabs 46 each form an initial portion of a corresponding guide ramp 48. The guide ramps 48 are continued on the inside of the housing container 14. During installation of the filter element 18 in the housing container 14, respectively radially outer circumferential sides of an outlet-side end plate 50 of the filter element 18 are guided on the guide ramps 48.

These mutually-opposite outer sides of the connecting tabs are equipped with stabilization profiles.

The connecting tabs 46 taper in a wedge-like manner at their free edges facing away from the free circumferential edges of the housing container 14. This simplifies the insertion of the connecting tabs 46 into the corresponding tab receptacles 52 of the housing cover 20 for connecting the housing container 14 with the housing cover 20.

The housing cover 20 has two tab receptacles 52. The tab receptacles 52 respectively fit one of the connecting tabs 46 of the housing container 14.

The tab receptacles 52 are located with respect to the filter axis 32 on opposite flattened circumferential sides of the housing cover 20. They are respectively integrally arranged in a region of the free circumferential edge of the housing cover 20. The tab receptacles 52 are integrated in the circumferential wall of the housing cover 20.

The tab receptacles 52 extend respectively parallel to the assembly axis of the housing cover 20 with the housing container 14, i.e. parallel to the filter axis 32. Imaginary central axes of the tab receptacles 52 lie in a plane with the filter axis 32. Regarded in the direction of the filter axis 32, this plane is inclined with respect to an imaginary plane with a minor axis of the oval installation opening 16. The central axes of the tab receptacles 52 are thus, analogously to the central axes of the connecting tabs 46, laterally offset on opposite sides with respect to the minor axis.

With respect to their respective central axes, which extend parallel to the filter axis 32, the tab receptacles 52 are circumferentially closed depressions. The connecting tabs 46 are respectively held on all circumferential sides in the corresponding tab receptacle 52. On the side opposite the housing container 14, the tab receptacles 52 have a corresponding insertion opening 54 for the corresponding connecting tab 46. The seal groove 33 extends radially outward around the tab receptacles 52. The interior spaces of the tab receptacles 52 are thus sealed to the environment.

When the housing cover 20 is assembled, the connecting tabs 46 mechanically stabilize the circumferential wall portions of the housing cover 20. Here, the connecting tabs 46 support the circumferential wall portions radially to the filter axis 32, i.e. radially relative to the element axis and to the housing axis.

The housing cover 20 further has two guide tracks 56 for guiding and supporting the corresponding leveling elements 58 of the filter element 18. The guide tracks 56 can be seen, for example, in FIGS. 9 to 11. With respect to the filter axis 32, the guide tracks 56 are located on diagonally opposite, radially inner circumferential sides of the housing cover 20.

The guide tracks 56 are respectively realized on a guide arm 60. Within an interior space of the housing cover 20, which contributes to the formation of the inlet portion of space 28, the guide arms 60 are integrally connected on a longitudinal side with the respective radially inner circumferential side of the circumferential wall of the housing cover 20. The respectively opposite longitudinal sides of the guide arms 60 form the corresponding guide tracks 56.

The guide tracks 60 respectively extend beyond the interior space of the housing cover 20. Outside the housing cover 20, the guide arms 60 are respectively chamfered on the radially inner longitudinal side with the guide tracks 56. The corresponding guide tracks 56 thus extend in the direction of the filter axis 32 toward the interior space of the housing cover 20 when regarded in the direction of the filter axis 32.

The guide tracks 56 respectively extend with an imaginary main guide line 62 in a plane with the installation axis, thus of the filter axis 32, the housing cover 20 with the housing container 14 and the filter element 18. During fitting of the housing cover 20 on the filter element 18, the main guide lines 62 predefines a path of a contact area of the corresponding leveling element 58 as it slides along the corresponding guide track 56. The main guide lines 62 are located in an imaginary minor plane, which is spanned by the minor axis of the flat-oval base area of the installation opening 16 and the filter axis 32.

The filter element 18 which is described in more detail below is shown in FIGS. 15 to 19 in various perspectives and sections. The filter element 18 is a flat conical oval round filter element. The filter element 18 is coaxial to the element axis, thus to the filter axis 32. The filter element 18 has a flat-oval cross-section. The short transverse axis, i.e. the minor axis, of the oval is located in the drawing plane of FIG. 15, the long transverse axis, i.e. the major axis, is perpendicular to the drawing plane. The filter element 18 is additionally flattened in the direction of the short transverse axis, thus the designation "flat conical oval." In contrast, "oval" designates an approximately elliptical cross-section. A radially outer circumferential side and a radially inner circumferential side of the filter element 18 respectively have a conical extent in the direction of the filter axis 32. The outer cross-section and the inner cross-section of the filter element 18 are tapered from their outlet-side end faces 68, which face the outlet portion of space 24, to the inlet-side end face 66.

The direction of the minor axis of the flat-oval filter element 18 extends vertically in the final installation location and normal operating position. In the installation location in the typical operating position, the filter axis 32 extends horizontally.

The filter element 18 comprises a filter medium 64 which is zigzag pleated to a filter bellows, and which is circumferentially closed with respect to the element axis, thus the filter axis 32. The filter medium 64 is a non-woven filter which is suitable for the filtration of air.

The extension of the filter bellows from the filter medium 64 in the direction radial to the element axis, thus to the filter axis 32, is smaller at its inlet-side end face 66 than at its outlet-side end face 68.

The filter medium is connected on its outlet-side end face 68 with the outlet-side end plate 50. The outlet-side end plate 50 is coaxial with the filter axis 20. The outlet-side end plate 50 is made of plastic. It is tightly bonded to the end face 68 of the filter medium 64. The radially outer circumferential side of the outlet-side end plate 50 abuts the radially inner circumferential side of the housing container 14 with minimal play.

The outlet-side end plate 50 has a central, coaxial outflow opening 70. The outflow opening 70 extends over the entire radially inner cross-section of the filter medium 64. An element interior space 72 of the filter element 18, which is surrounded by the filter medium 64, is connected with the outlet portion of space 24 via the outflow opening 70.

The seal 36 is arranged on the outer side of the outlet-side end plate 50 axially opposite the filter medium 64. The seal 36 is made of elastic polyurethane foam. It is foamed onto the outlet-side end plate 50. The seal 36 is coaxial with the element axis, thus with the filter axis 32, and circumferentially surrounds the outflow opening 70. It extends in the axial direction. It is supported in the axial direction on the sealing surface 34 of the housing container 14.

The filter medium is sealingly connected on its inlet-side end face 66 with an inlet-side end plate 74. The inlet-side end plate 74 is made of polyurethane. The inlet-side end plate 74 closes the element interior space 72 from the inlet portion of space 28. In a similar manner to the outlet-side end plate 50, the inlet-side end plate 74 is sealingly connected with the filter medium 64.

A coaxial support tube 76 extends in the element interior space 72 between the inlet-side end plate 74 and the outlet-side end plate 50. The support tube 76 is made of plastic. It is structured as a grid. Its circumferential side is permeable to air. The support tube 76 has a flat conical oval shape corresponding to the filter medium 64. The radially inner circumferential side of the filter medium 64 may be supported on the radially outer circumferential side of the support tube 76.

A support element 78 is arranged on the axially outer side of the inlet-side end plate 74 facing the element interior space 72. The support element 78 is located on the raw air side of the filter medium 64. The support element 78 is fixedly connected to the inlet-side end plate 74. The support element 78 is made of an elastic polyurethane foam. The support element 78 is foamed onto the outlet-side end plate 74.

The support element 78 is sleeve-like. It has the shape of a hollow cylinder, the major axis of which extends coaxially to the filter element 32, thus to the element axis, in the embodiment shown. A cavity 80 of the support element 78 is open on its end face facing the inlet-side end plate 74. The support element 78 has an approximately oval cross-section. In FIG. 16, its short transverse axis is in the drawing plane, its long transverse axis is perpendicular to the drawing plane. With an installed filter element 18, the orientation of the support element 78 with respect to the filter axis 32 corresponds to the orientation of the support pillar 42 of the housing cover 20.

When the filter element 18 is correctly installed, the portion of the support pillar 42 surrounded by the counter support groove 44 is inserted into the cavity 80 of the support element 78. Here, the circumferential wall of the support element 78 is inserted into the counter support groove 44 of the support pillar 42.

On its free side facing away from the end plate 74, the wall thickness of the support element 78 reduces in a conical portion toward the free edge. The insertion of the support element 78 into the counter support groove 44 of the support pillar 42 can thus be simplified.

The filter element 18 is supported via the support pillar 42 against the filter housing 12 by means of the support element 48. The support occurs radially, i.e. transverse to the filter axis 32, thus transverse to the element axis and to the housing axis, as well as axially. Through the interaction of the support element 48 with the support pillar 42, the filter element 18 is held and positioned radially and axially on the inlet side, i.e. the raw air side. The filter element 18 can thus be held in the filter housing 12 on the side facing the inlet portion of space 28.

Further, two support webs 82 are respectively arranged on the radially outer edges of the inlet-side end plate 74 in the region of the short transverse sides. The support webs 82 respectively project beyond the outlet-side end plate 74 both in the radial direction and in the axial direction. The support webs 82 are respectively supported in the radial direction at support points 83, shown inter alia in FIGS. 3, 10 and 11, on the inner side of the housing container 20.

The aforementioned leveling elements 58 are located radially outward with respect to the element axis, thus the filter axis 32, on the inlet-side end plate 74. The leveling elements 58 are made of polyurethane. They are integrally connected to the inlet-side end plate 74. The leveling elements 58 are arranged on a raw air side of the filter element 18.

The leveling elements 58 are arranged on circumferential sides of the inlet-side end plate 74 which are diagonally opposite with respect to the filter axis 32. The imaginary center point of the leveling elements 58 is located here on a minor axis of a flat-oval cross-section of the filter element 18. In the direction of the minor axis, the filter bellows of the filter element 18 has a smaller radial extension at the inlet-side end face 66 than at the outlet-side end face 68. The minor axis lies in an imaginary plane which extends parallel to the flat-oval base area of the filter element 18. The minor axis is the short axis of the imaginary plane through the midpoint thereof. In contrast, the major axis is the long axis of the imaginary plane through the midpoint thereof.

The leveling elements 58 respectively extend radially and axially outward over the radially outer circumferential side of the filter bellows of the filter medium 64 and the inlet-side end plate 74.

The distances of the radially outer circumferential sides of the leveling elements 58 from the filter axis 32 correspond respectively to the distances of the corresponding radially outer circumferential sides of the outlet-side end plate 50 from the filter axis 32.

In the final installation location of the filter element 18 in the filter housing 12 in the usual operating position thereof, one of the leveling elements 58 is arranged spatially below. The other leveling element 58 is arranged spatially above, vertically, above the former leveling element 58.

By means of the leveling elements 58, a uniform radial distance is realized with respect to the filter axis 32 between the radially outer circumference of the inlet-side end plate 74 and an opposite radially inner circumference of the housing cover 20 for the formation of a gap 40.

When the filter housing 12 is assembled, the tab receptacles 52 with the connecting tabs 46 are respectively approximately arranged on the same circumferential side of the filter housing 12 as one of the guide tracks 56 for one of the leveling elements 58. Here, the tab receptacles 52/connecting tabs 46 and the corresponding leveling elements 58/guide tracks 56 are arranged circumferentially offset from one another, wherein the tab receptacles 52/connecting tabs 46 overlap the corresponding leveling elements 58/guide tracks 56 in the radial direction.

The guide tracks 56 are respectively arranged between one of the leveling elements 58 and one of the tab receptacles 52/connecting tabs 46. By means of the connecting tabs 46/tab receptacles 52, the guide tracks 56 are supported against pressure from the leveling elements 58. The leveling elements 58 press from the inside against the corresponding circumferential wall portion of the housing cover 20. The connecting tabs 46 and the corresponding tab receptacles 52 respectively act against this from the outside.

During operation of the air filter 10, the air to be filtered flows through the inlet 26, indicated in FIG. 1 by an arrow 84, into the inlet portion of space 28. From there, the air passes substantially axially through the gap 40 into the upstream annular space 38 to the upstream side of the filter medium 64. The air flows through the filter medium 64 from radially outside to radially inside and is purified. The purified air flows through the circumferential side of the support tube 76 and passes into the element interior space 72. The purified air leaves the element interior space 72 substantially in the axial direction and enters the outlet portion of space 24. From there, the filtered air exits the filter housing 12 through the outlet 22, indicated in FIG. 1 by arrow 86.

For maintenance purposes, for example for maintenance or replacement of the filter element 18, the filter housing 12 can be opened. For this purpose, the housing cover 20 is removed in the axial direction from the housing container 14. Here, the support element 78 is automatically pulled out of the counter support groove 44 at the end of the support pillar 42. The connecting tabs 46 are pulled out of the tab receptacles 52. The leveling elements 58 glide along the guide tracks 56. The filter element 18 is pulled out of the element portion of space 30 of the housing container 14 in the axial direction. It may be replaced by a new filter element 18 or reinstalled after cleaning.

For installation, the filter element 18 is advanced in the axial direction in the housing container 14 with the outlet-side end plate 50 forward, until the seal 36 abuts the sealing surface 34. Subsequently, the housing cover 20 is placed with its open side forward in the axial direction onto the installation opening 16 of the housing container 14. The connecting tabs 46 are inserted here into the respective tab receptacles 52. The housing cover 20 is thus pre-adjusted to the housing container 14.

During advancing of the housing cover 20 onto the housing container 14 in the axial direction, the connecting tabs 46 and the tab receptacles 52 interact as guiding aids. Once the free ends of the guide arms 60 of the housing cover 20 reach the leveling elements 58, the guide arms 60 encompass the radially opposite sides of the leveling elements 58 from the outside. Upon further advancement of the housing cover 20, the leveling elements 58 are then guided along the main guide line 62 of the guide tracks 56 of the guide arms 60. Upon further pressing of the housing cover 20, the side of the filter element 18 with the inlet-side end plate 74 is continuously lifted into its final position by means of the lower guide tracks 56. The filter element 18 is positioned and centered in the housing cover 20. Finally, upon further pressing, the support element 78 of the housing cover 20 is automatically inserted into the counter support groove 44 of the support pillar 42. The radially inner portion at the end of the support pillar 42 engages here in the cavity 80 of the support element 78. In the correct state of installation, the element axis extends coaxially with the housing axis. Finally, the housing cover is fixed to the housing container 14 in a manner of no further interest here.

What is claimed is:

1. A filter housing of a filter for air, water, fuel, oil or urea-water solution of an internal combustion engine, comprising:
   at least one inlet for fluid to be purified; and
   at least one outlet for purified fluid;
   a hollow filter element in which a filter medium for filtering a fluid, which surrounds an element interior space with respect to a filter axis, is exchangeably arranged so as to separate the at least one inlet from the at least one outlet;
   wherein the filter housing has at least two housing parts, which can at least partly be separated from one another in order to open up an installation opening of the filter housing for the hollow filter element;
   wherein the at least one of the housing parts includes:
   a first housing part having a first annular axial end face surrounding the installation opening for receiving the hollow filter element into an interior of the first housing part; and
   a second housing part connectable to the first housing part at the first annular axial end face and closing the installation opening;

at least one connecting tab formed on the first annular axial end face of the first housing part, the at least one connecting tab projecting axially outwardly away from the first housing part at the first annular axial end face, the at least one connecting tab projecting axially outwardly to terminate at a tapered guide ramp end having a taper on a radially inner side of the at least one connecting tab;

at least one tab receptacle arranged in an interior of the second housing part and integrated into a circumferential wall of the second housing part, the at least one tab receptacle having an insertion opening for receiving the at least one connecting tab into an interior of the at least one tab receptacle;

wherein the at least one connecting tab is inserted into the at least one tab receptacle to mount the second housing part onto the first housing part.

2. The filter housing according to claim 1, wherein
the at least one of the housing parts has at least one guide track for guiding and supporting at least one leveling element of the hollow filter element.

3. The filter housing according to claim 1, wherein
the first annular axial end face of the first housing part forms a base area of the installation opening which is oblong or oval; and
wherein the at least one connecting tab and the at least one tab receptacle are located at least partially on or next to a minor plane with a minor axis of the base area of the installation opening and an installation axis of the hollow filter element in the filter housing;
wherein an opposing connect tab and connecting receptacle are arranged at least partially on or next to the minor plane.

4. The filter housing according to claim 2, wherein
the at least one guide track is arranged in the interior of the second housing part and is arranged on the circumferential wall of the second housing part;
wherein the at least one guide track projects axially outwardly beyond the second housing part at an annual end face of the second housing part.

5. The filter housing according to claim 2, wherein
the at least one guide track is at least two guide tracks, the at least two guide tracks spaced apart from each other and are located with respect to the filter axis on diagonally opposite radially inner circumferential sides of the second housing part.

6. The filter housing according to claim 1, wherein
at least one support pillar for supporting at least one support element of the hollow filter element with respect to the housing axis, which coincides with the element axis in an installed hollow filter element, is centrally arranged
on an interior surface of the second housing part and projecting from the second housing part into the interior of the second housing part.

* * * * *